United States Patent

[11] 3,599,017

[72] Inventor Malcolm M. Oakes
Torrance, Calif.
[21] Appl. No. 819,831
[22] Filed Apr. 28, 1969
[45] Patented Aug. 10, 1971
[73] Assignee Hughes Aircraft Company
Culver City, Calif.

[54] CAPACITOR CHARGE CIRCUIT
7 Claims, 1 Drawing Fig.
[52] U.S. Cl. ................................................ 307/252 J,
219/136, 307/246, 328/67, 328/72
[51] Int. Cl. .................................................. H03k 17/00,
H03k 1/00
[50] Field of Search ........................................ 307/252.50,
252.51, 246; 328/67, 72; 315/238—241; 219/136

[56] References Cited
UNITED STATES PATENTS
3,049,642 8/1962 Quinn .......................... 307/252
3,139,585 6/1964 Ross ............................ 328/67
3,258,697 6/1966 Guettel ........................ 328/72
3,354,288 11/1967 O'Neal ........................ 328/72

Primary Examiner—Donald D. Forrer
Assistant Examiner—David M. Carter
Attorneys—James K. Haskell and Allen A. Dicke, Jr ABSTRACT: A signal comparator compares a reference voltage with a related voltage. The related voltage is related to the higher of the actual voltage on the capacitor or a charging signal voltage. The signal comparator output signal is controlled so that it can fire the capacitor charging SCR only on the downslope of a rectified wave so that the voltage to the capacitor can be no higher than the voltage at which the SCR was triggered.

PATENTED AUG 10 1971
3,599,017
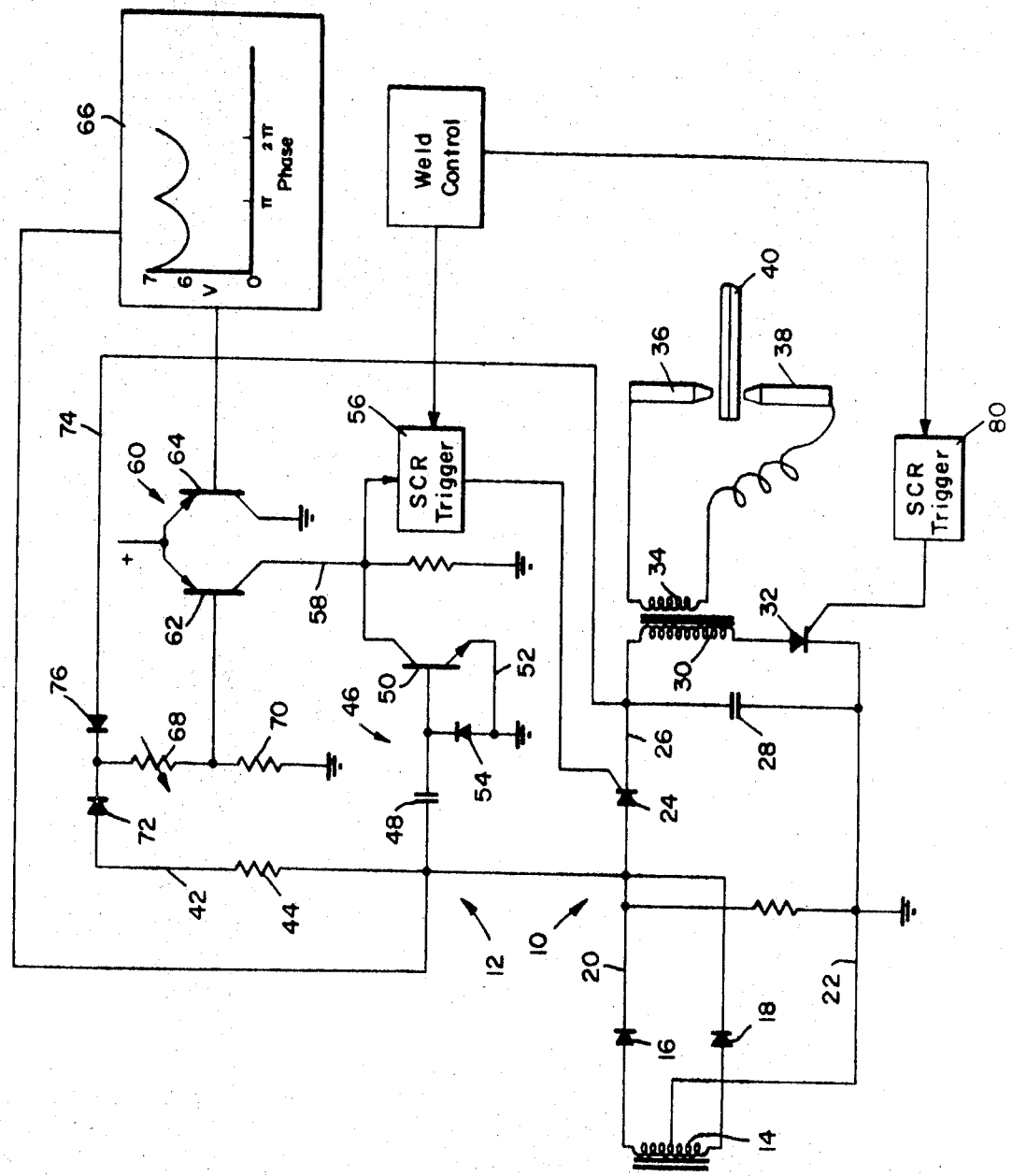
Malcolm M. Oakes,
INVENTOR.
BY.
ALLEN A. DICKE, Jr.,
AGENT.

CAPACITOR CHARGE CIRCUIT

BACKGROUND

This invention is directed to a capacitor charge circuit and particularly to a capacitor charge circuit which rapidly brings a capacitor to be charged up to the voltage corresponding to the desired charge. It is particularly useful in quickly charging the capacitor in a capacitor discharge welding system.

Capacitor welding systems are well known. They employ the charge on a capacitor to supply the energy necessary for welding, and are often employed in other types of heating. Usually a stepdown transformer is employed between the capacitor and the welding electrodes so that capacitors of reasonable capacity may be employed, and high currents at fairly low voltages are obtained at the welding electrodes. The amount of welding energy is related to the voltage to which the capacitor is charged and to the size of the capacitor. Thus, for a particular capacitor, it is necessary to charge the capacitor to the correct voltage level to obtain the correct amount of welding energy. Since the amount of energy stored in the capacitor is related to the voltage thereon, previous systems have employed capacitor charging circuits which employ the capacitor voltage as the only feedback signal. However, with these systems the proper capacitor voltage was achieved asymptotically, and accordingly a considerable amount of time was required to obtain the full desired voltage. Accordingly, on some automatic welding jobs, the weld cycle time was limited by the capacitor charging rate instead of by other limiting conditions.

SUMMARY

In order to aid in the understanding of this invention, it can be stated in essentially summary form that it is directed to a capacitor charging control circuit. The charging control circuit employs switching means to control rectified current flow to the capacitor to be charged. First and second signals are compared. The first signal is a rectified sine wave signal at lower voltage than the switching means input. The second signal is the voltage on the capacitor. The higher of these two first and second signals is employed in a signal comparator, which compares that signal to a reference signal. The signal comparator controls the switching means.

Accordingly, it is an object of this invention to provide a signal comparator circuit to control the charging of a capacitor. It is a further object of this invention to provide appropriate signals to a signal comparator input so that a capacitor charging switching means is controlled to quickly charge the capacitor to the desired value. It is a further object to provide control for a capacitor charging SCR so that it only fires on the downslope portion of a rectified sine wave. It is still another object of this invention to provide variable control of capacitor charging by controlling the signal inputs to a signal comparator. It is a further object to provide a capacitor charge circuit which employs first and second signal comparators so that the proper signals for capacitor charging are compared to control a capacitor charging SCR.

Other objects and advantages of this invention will become apparent from a study of the following portion of the specification, the claims and the attached drawing.

BRIEF DESCRIPTION OF THE DRAWING

The single FIGURE of the drawing is a schematic electric circuit diagram of the capacitor charge circuit of this invention as employed with a capacitor welding circuit.

DESCRIPTION

Referring to the drawing, the capacitor charge circuit of this invention includes power circuit 10 and control circuit 12. Power circuit 10 has a power input including transformer secondary 14. The secondary 14 is energized from any convenient power supply, and for the purposes of illustration, it is assumed that the power supply operates at 60 cycles per second. However, it is clear that this frequency is merely illustrative, and any convenient frequency can be employed. Transformer secondary 14 has its extremities connected to diodes 16 and 18, which have their outputs connected together to unregulated positive bus 20. Transformer secondary 14 is center tapped with its center connected to negative bus 22. Bridge or single phase rectifiers could alternatively be employed.

Unregulated positive bus is connected to and terminates at SCR 24 which controls the charging of capacitor 28. The output of SCR 24 is connected to regulated positive bus 26. Capacitor 28 is the capacitor upon which the voltage level is controlled to control the amount of charge thereon. Capacitor 28 is connected between buses 22 and 26. Paralleled across capacitor 28 is transformer primary 30 which is serially connected through SCR 32. The firing of SCR 32 controls the discharge of capacitor 28 through transformer primary 30.

Transformer secondary 34 is energized by magnetic coupling from primary 30 and has its ends connected to welding electrodes 36 and 38. Preferably, at least one of these electrodes is movable so that they can be engaged against work pieces 40 for the purpose of welding these workpieces together.

With respect to control circuit 12, first signal line 42 is connected to be energized from unregulated positive bus 20 through resistor 44. Bus 20 carries a waveform of full wave rectified sine wave, and resistor 44 such that the peak value of voltage in line 42 is about one-third that of the peak value of voltage in line 20. The two lines are in synchronism, both carrying rectified sine waves, and differ only in amplitude. It is desirable to fire SCR 24 only on the downslope of the rectified sine waves so that the voltage does not rise after the SCR is fired. This prevents over voltage from overcharging capacitor 28, which could occur if the SCR were fired upon the rising sine wave.

Such lockout is provided by 0 to pi/2 lockout circuit 46. Capacitor 48 is connected to line 20 and to the base of transistor 50. The emitter of transistor 50 is connected through line 52 to ground and through diode 54. Diode 54, in turn, is connected to the base of transistor 50. The collector of transistor 50 is connected to the input of SCR trigger circuit 56, which in turn controls firing of SCR 24. Trigger circuit 56 is conventional, such as can be selected from pages 41—69 of General Electric Co. SCR Manual, Third Edition, 1964.

Pi/2 lockout circuit 46 is such that upon rising voltage in line 20, transistor 50 is forward biased to connect SCR firing signal line 58 to ground through line 52. Thus, no input to line 58 can be effective upon rising voltage in line 20. However, when voltage starts falling in line 20, transistor 50 is biased off to remove the ground connection from SCR firing signal line 58. Capacitor 48 recharges through diode 54 on the downslope. The Pi/2 lockout circuit 46 thus inhibits the firing of SCR 24 between 0° and 90° and between 180° and 270° of the sine wave cycle. In other words, SCR firing line 58 is ungrounded only on the negative-going slope of the rectified sine wave.

Voltage comparator 60 is comprised of transistors 62 and 64 having their emitters connected together to a current source, as from a conventional power supply. The collector of transistor 64 is connected to ground, and its base is connected to signal conditioner 66. Signal conditioner 66 has an input from line 20. As previously stated, line 20 has a rectified sine wave signal therein, which signal is in phase with a signal impressed upon the input of SCR 24. Signal conditioner 66 has an output to the base of transistor 64 which comprises a low amplitude inverted rectified sine wave displaced above zero voltage. For example, the rectified sine wave has an amplitude of 1 volt peak to peak and it has a peak value of +7 volts with respect to ground. Thus, the base of transistor 64 is connected to a reference voltage with positive spikes. When the base of transistor 62 is below the reference voltage, transistor 62 is conductive, giving a firing signal to trigger 56. When the voltage on the base of transistor 62 is above the reference voltage, transistor 62 is cut off so there is no firing signal to SCR trigger 56.

Transistor 62 of voltage comparator 60 has its collector connected to SCR firing signal line 58, and has its base connected to the intermediate point of voltage divider comprised of resistors 68 and 70. Resistor 70 has its other end connected to ground. In cases where the desired voltage on energy storage capacitor 28, when the capacitor is fully charged, is fixed, resistor 68 can be of fixed value. However, in most cases it is desirable that the voltage on the energy storage capacitor 28, when it is charged to the desired value, be selectable to different values on different charges. In such a case, resistor 68 is made variable as illustrated. Variability is preferable.

The upper end of resistor 68 is connected to line 42 through diode 72 and is connected to the positive side of energy storage capacitor 28 through second signal line 74 and diode 76. The diodes 72 and 76 connected face to face to the voltage divider comprised of resistors 68 and 70 act as an analog signal comparator by comparing the voltages of these two signals and permitting the higher of the instantaneous voltages to be impressed upon the voltage divider.

For purposes of illustrating the operation of the capacitor charge circuit, and with respect to the table of components below, it will be assumed that transformer secondary 14 is energized at 60 cycles per second and results in a no load full wave rectified voltage in unregulated positive bus 20 of 400 volts, zero to peak, to charge capacitor 28 to a desired maximum of 300 volts. Furthermore, signal conditioner 66 has an output of inverted full wave rectified voltage form with a 1 volt amplitude and is displaced at +7 volts peak. It is assumed that energy storage capacitor 28 initially carries no charge.

The three examples given below illustrate, together with the exemplary values in the table below, the manner in which the charge circuit fires the SCR at the optimum time to rapidly charge the capacitor 28, to bring the capacitor up to the desired charge as quickly as is feasible. In the first example, the desired charge on the capacitor 28 is 7 volts. This capacitor is initially uncharged, and thus line 74 has a zero charge in it. Variable resistor 68 is reduced to zero ohms. It is understood that when the base of transistor 62 is below the 7 volt reference, SCR trigger 56 is fired.

Thus, with the valve of 700 ohms on resistor 70, when 10 milliamps or less is flowing in resistor 70, this condition is met. Ten milliamps, in turn, on the 5 kilo-ohm resistor 44 means 50 volts at the input of resistor 44, which is a point fairly well down the downslope of the rectified wave in line 20. Thus, when the downslope voltage goes down to 50 volts, the voltage on the base of transistor 62 goes below 7 volts to cause SCR firing.

Because of copper losses and internal impedance in the transformer and the line, the capacitor receives only a partial charge on the first half cycle, even though the SCR was fired substantially 43 volts above the desired charge on the capacitor. Charging continues on the following half cycles until the voltage on line 74 rises to the 7 volts which causes cutoff.

In the second case, the desired charge on capacitor 28 is 100 volts. Now, variable resistor 68 is set to 9.3 kilo-ohms so that the total resistance between resistor 68 and 70 is 10 kilo-ohms for a hundred-volt drop with 10 milliamps. Since the resistor 70 is 700 ohms, the divided voltage on the vase of transistor 62 is again 7 volts. With capacitor 28 uncharged, and with a peak voltage of 400 volts on the input to resistor 44, current in excess of 10 milliamps flows through resistor 44, resistor 68 and resistor 70 so that the current through resistor 70 is in excess of 10 milliamps. In this condition, the voltage on the base of transistor 62 is in excess of 7 volts, and SCR trigger 56 does not fire SCR 24. However, as the voltage applied to the input side of resistor 44 goes down to 150 volts, with the decreasing voltage of the downslope of the rectified half wave, voltage division is such as to fire the SCR trigger 56. The total resistance of resistors 44, 68 and 70 is 150 kilo-ohms, so that at 150 volts applied thereto, 10 milliamps is flowing. Since the voltage is going down, and 10 milliamps produces a 7 volt equal to the reference, as the voltage goes down the downslope, the trigger is fired. Thus, firing is accomplished at about 150 volts on the downslope of the curve when a 100-volt charge is desired. Again, successive charging on successive half cycles is accomplished until line 74 reaches the desired 100-volt value, which value produces the cutoff value of 7 volts on the base of transistor 62.

In the third case, 200 volts is desired on capacitor 28. To obtain this value, variable resistor 68 is set to 19.3 kilo-ohms so that the total resistance through resistors 44, 68 and 70 is 25 kilo-ohms. Thus, at 250 volts through this series connection 10 milliamps is passing through resistor 70 which causes the application of 7 volts on the base of transistor 62. Below that value SCR trigger 56 causes firing of SCR 24, and the voltage goes below that value on the downslope of the rectified sine wave. Accordingly, firing occurs on the downslope, when the reducing voltage on the rectified wave decreases below 250 volts, until the capacitor is charged sufficiently to raise the voltage of line 74 to a point where when compared to the voltage in line 42 as an analog signal comparator, the voltage to the base of transistor 62 is above the reference point. Thus, firing continues in each half wave until feedback from the charged capacitor signals sufficient charge.

There is a certain amount of leakage from energy storage capacitor 28 through line 74, diode 76 and resistors 68 and 70. Recharging to overcome this leakage loss, and any other leakage loss, is accomplished by the fact that the signal from signal conditioner 66 to the base of transistor 64 is an inverted full wave rectified sine wave. This means that there are fairly sharp positive-going peaks. These peaks are phase related to the input of SCR 24 so that upon the occurrence of such a peak on the base of transistor 64, and consequent turnon of transistor 62, SCR 24 is turned on only for a very short duration to pass enough current to only slightly raise the voltage on energy storage capacitor 28, possibly only a few millivolts. This maintains the charge at the exact value.

After the desired charge is reached upon energy storage capacitor 28, the circuit is ready for a welding pulse. Electrodes 36 and 38 are pressed into engagement with workpieces 40 and weld control 78 is actuated. Weld control 78 is simply a circuit which prevents the firing of SCR 24 and causes the firing of SCR 32 through SCR trigger 80. Thus, weld control 78 can be a simple pushbutton switch which grounds out any incoming firing signal to SCR trigger 56, and subsequently thereto connects SCR trigger 80 to a positive voltage firing source. It is necessary to prevent firing of SCR 24 during the welding operation because of the virtual short circuit on the output of SCR 24, when SCR 32 is conductive. The turns ratio between primary 30 and secondary 34 is such to cause adequate welding current between the electrodes and through the workpieces. After welding, SCR 32 is turned off and SCR 24 is again permitted to charge energy storage capacitor 28.

Particular circuit components for the example given above are listed in the table below. Of course, these components can be varied in accordance with the varying needs.

TABLE

| Ref. No. | Component | Identification |
| --- | --- | --- |
| 16 | diode | 1N 4249 |
| 18 | diode | 1N 4249 |
| 24 | SCR | 2N 1850 |
| 28 | capacitor | 1,000 uf 450 v |
| 32 | SCR | eg: MCR 2935-7 |
| 30, 34 | transformer | turns ratio 500:1 |
| 44 | resistor | 5 K ohm |
| 48 | capacitor | 0.01 uf 1 KV |
| 50 | transistor | 2N 2484 |
| 54 | diode | 1N 3600 |
| 62 | transistor | 2N 1132 |
| 64 | transistor | 2N 1132 |
| 68 | variable resistor | 0-30 K ohm |
| 70 | resistor | 700 ohm |
| 72 | diode | 1N 4249 |
| 76 | diode | 1N 4249 |

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What I claim is:

1. A capacitor charge and discharge circuit, said circuit comprising:

a capacitor, power supply means, a silicon-controlled rectifier, said power supply means, said silicon-controlled rectifier and said capacitor being serially connected, so that said silicon-controlled rectifier controls the charging current from said power supply means to said capacitor, said power supply means being adapted to supply electric voltage between a maximum and zero;

a discharge switch serially connected to a transformer primary to comprise said discharge circuit, said discharge circuit being connected in parallel to said capacitor, so that when said capacitor discharges through said transformer primary, said discharge switch being open during capacitor charging, the improvement comprising:

control means connnected to said silicon-controlled rectifier to control the amount of maximum charge upon said capacitor, said control means comprising:

a lockout circuit connected to said silicon-controlled rectifier to permit firing of said silicon-controlled rectifier into conduction only upon reducing voltage at the input of said silicon-controlled rectifier;

a voltage comparator having a reference voltage thereto;

a first signal means signaling the instantaneous value of voltage to the input of said silicon-controlled rectifier, said first signal means being connected to said voltage comparator so that when the voltage on the input of said silicon-controlled rectifier decreases so that it is proportionately below the reference voltage on said voltage comparator, said silicon-controlled rectifier is triggered to charge said capacitor.

2. The capacitor charge circuit of claim 1 wherein said first signal means includes a pair of serially connected voltage-dividing resistors, the point between said pair of resistors being connected to said voltage comparator.

3. The capacitor charge circuit of claim 2 wherein a second signal means is connected between said capacitor and said voltage comparator so that when said capacitor is charge to the desired level, said second signal means signals to said voltage comparator to prevent the first signal means from firing said silicon-controlled rectifier.

4. The capacitor charge circuit of claim 3 wherein said first and second signal means are connected to said voltage comparator through an analog signal comparator.

5. The capacitor charge circuit of claim 4 wherein said pair of resistors comprise one fixed resistor and one variable resistor so that the amount of charge on said capacitor can be selected by variation of said variable resistor.

6. The capacitor charge circuit of claim 5 wherein said voltage comparator has signal conditioner means connected thereto, said signal conditioner means transmitting a spiked reference voltage to said voltage comparator.

7. The capacitor charge circuit of claim 6 wherein said capacitor is the weld energy capacitor in a welding circuit and said transformer primary is a welding transformer primary connected across said capacitor, said transformer primary having an associated transformer secondary adapted to be connected to a workpiece so that discharge of said capacitor through said welding transformer is adapted to cause a large current discharge through a workpiece.